(12) United States Patent
Zhang et al.

(10) Patent No.: US 9,092,428 B1
(45) Date of Patent: Jul. 28, 2015

(54) SYSTEM, METHODS AND USER INTERFACE FOR DISCOVERING AND PRESENTING INFORMATION IN TEXT CONTENT

(71) Applicants: Guangsheng Zhang, Palo Alto, CA (US); Chizhong Zhang, Palo Alto, CA (US)

(72) Inventors: Guangsheng Zhang, Palo Alto, CA (US); Chizhong Zhang, Palo Alto, CA (US)

( * ) Notice: Subject to any disclaimer, the term of this patent is extended or adjusted under 35 U.S.C. 154(b) by 310 days.

(21) Appl. No.: 13/709,827

(22) Filed: Dec. 10, 2012

Related U.S. Application Data

(60) Provisional application No. 61/568,657, filed on Dec. 9, 2011.

(51) Int. Cl.
*G06F 17/28* (2006.01)

(52) U.S. Cl.
CPC ........................................ *G06F 17/28* (2013.01)

(58) Field of Classification Search
CPC ................... G06F 17/30722; G06F 17/30873; G06F 17/30882
USPC ......................................... 704/1–10; 715/234
See application file for complete search history.

(56) References Cited

U.S. PATENT DOCUMENTS

| | | | |
|---|---|---|---|
| 7,702,611 B2 | 4/2010 | Chi | |
| 2002/0143529 A1* | 10/2002 | Schmid et al. | 704/231 |
| 2006/0253476 A1* | 11/2006 | Roth et al. | 707/100 |
| 2007/0061717 A1 | 3/2007 | Cragun | |
| 2007/0280381 A1* | 12/2007 | Amini et al. | 375/340 |
| 2008/0133488 A1* | 6/2008 | Bandaru et al. | 707/3 |
| 2008/0243791 A1* | 10/2008 | Suzuki et al. | 707/3 |
| 2008/0294978 A1* | 11/2008 | Klintsov et al. | 715/234 |
| 2014/0046976 A1* | 2/2014 | Zhang et al. | 707/772 |
| 2014/0136323 A1* | 5/2014 | Zhang et al. | 705/14.53 |

* cited by examiner

*Primary Examiner* — Michael N Opsasnick

(57) ABSTRACT

A system with methods and user interface for discovering and presenting information in text content with different view formats, including steps of identifying the grammatical, semantic, contextual, and topical attributes of the words or phrases in the text content, and providing user interface objects to allow the user to specify an attribute of the words or phrases in the content and perform an action on the words or phrases. The supported actions include extracting, displaying in a specific format, showing or hiding, or highlighting the words or phrases.

20 Claims, 13 Drawing Sheets

Figure 2

```
Over-the-counter drugs

Aleve
Alternagel
Bayer
Dramamine
Excedrin
Tylenol
..
...
..
Xylocaine
...
...
...
```

Hotel ABC

| | | |
|---|---|---|
| ☐ | Show all comments | 910 |
| ☒ | Show positive comments only | |
| ☐ | Show negative comments only | |

Major topics:

Room is good ......................................Link1, Link2
      fantastic....................................Link2
      very clean.................................Link 3
      ......see more....

Bathroom spacious ..................................Link 2, Link 3
      amazing tub................................Link1
      with a nice deep tub.......................Link 4
      ......see more.....

Bed

................

More topics....

Figure 9A

Hotel ABC

| | | |
|---|---|---|
| ☐ | Show all comments | 910 |
| ☐ | Show positive comments only | |
| ☒ | Show negative comments only | |

Major topics:

Room not so great ...............................Link1, Link2
  not good for the price ....................Link1
  ......see more....

Bathroom was not cleaned well ......................Link2

......see more.....

Bed
  too hard.............................................Link 5

.....see more....

More topics....

View comments by topics:

Room

Bathroom

Bed

Service

Pool

More topics....

Figure 10B

View comments by topics:

Room is good .....................................Link1, Link2
    fantastic....................................Link2
    very clean..................................Link 3
    ......see more....

Bathroom spacious ....................................Link 2, Link 3
    amazing tub.................................Link1
    with a nice deep tub.......................Link 4
    ......see more.....

Bed

................

More topics....

Figure 12

1210
  o Highlight positive comments o Highlight negative comments 1215
  o Highlight both positive and negative comments o No highlighting Topic list:

1220
Published in September

Amazing story

1230
Well-written

Required reading

<u>Boring and dull</u>

Word cloud:

1250
Well-written

Amazing story   Published in September

<u>Boring and dull</u>   Required reading

1260

SYSTEM, METHODS AND USER INTERFACE FOR DISCOVERING AND PRESENTING INFORMATION IN TEXT CONTENT

CROSS REFERENCES TO RELATED APPLICATIONS

The present application claims priority to U.S. Provisional Patent Application 61/568,657 entitled "SYSTEM, METHODS, AND USER INTERFACE FOR ORGANIZING DOCUMENT CONTENTS INTO A HIERARCHICAL STRUCTURE AND SELECTIVE HIGHLIGHTING OF TERMS" filed by the present inventor on Dec. 9, 2011. The disclosures of the above application are incorporated herein by reference.

The present application also make references to U.S. patent application Ser. No. 12/782,545, entitled "SYSTEM AND METHODS FOR AUTOMATED DOCUMENT TOPIC DISCOVERY, BROWSABLE SEARCH AND DOCUMENT CATEGORIZATION" filed on May 18, 2010 by the present inventor. U.S. patent application Ser. No. 12/782,545 further claims priority to U.S. patent application Ser. No. 12/715,385, titled "SYSTEM AND METHODS FOR AUTOMATED DOCUMENT TOPIC DISCOVERY, BROWSABLE SEARCH AND DOCUMENT CATEGORIZATION", filed on Mar. 2, 2010. U.S. patent application Ser. No. 12/715,385 claims priority to U.S. Provisional Patent Application 61/160,625, titled "SYSTEM, METHODS, USER INTERFACE, AND ARTICLE OF MANUFACTURE FOR SCALABLE KNOWLEDGE-BASED DOCUMENT TOPIC DISCOVERY, CONTENT RECOGNITION, SEARCH, RANKING, AND CATEGORIZATION", filed by the present inventor on Mar. 16, 2009, and U.S. Provisional Patent Application 61/298,422, titled "SYSTEM AND METHODS FOR AUTOMATED DOCUMENT TOPIC DISCOVERY, BROWSABLE SEARCH AND DOCUMENT CATEGORIZATION", filed by the present inventor on Jan. 26, 2010.

The present application also makes references to U.S. patent application Ser. No. 13/707,940 titled "AUTOMATED TOPIC DISCOVERY IN DOCUMENTS AND CONTENT CATEGORIZATION", filed on Dec. 7, 2012. U.S. patent application Ser. No. 13/707,940 further claim priority to U.S. Provisional Patent Application 61/682,205 titled "SYSTEM AND METHODS FOR DETERMINING TERM IMPORTANCE AND RELEVANCE BETWEEN TEXT CONTENTS USING CONCEPTUAL ASSOCIATION DATASETS" filed on Aug. 11, 2012, and U.S. patent application Ser. No. 13/655,415 entitled "SYSTEM AND METHODS FOR DETERMINING RELEVANCE BETWEEN TEXT CONTENTS" filed by the present inventor on Oct. 18, 2012, and U.S. Provisional Patent Application 61/568,657 entitled "SYSTEM, METHODS, AND USER INTERFACE FOR ORGANIZING DOCUMENT CONTENTS INTO A HIERARCHICAL STRUCTURE AND SELECTIVE HIGHLIGHTING OF TERMS" file by the present inventor on Dec. 9, 2011, and U.S. patent application Ser. No. 12/972, 462 entitled "AUTOMATED TOPIC DISCOVERY IN DOCUMENTS" filed by the present inventor on Dec. 18, 2010. U.S. patent application Ser. No. 12/972,462 further claims priority to U.S. Provisional Patent Application 61/299, 823, titled "SYSTEM AND METHODS FOR AUTOMATED DOCUMENT TOPIC DISCOVERY, BROWSABLE SEARCH, RELEVANCE RANKING, SUMMARY GENERATION AND DISPLAY", filed by the present inventor on Jan. 29, 2010, U.S. Provisional Patent Application 61/306,523, titled "SYSTEM AND METHODS FOR EFFICIENT EMAIL INDEXING, SEARCH, AND STORAGE", filed by the present inventor on Feb. 21, 2010, and U.S. Provisional Patent Application 61/306,524, titled "SYSTEM, METHODS, AND USER INTERFACE FOR EXTRACTING AND DISPLAYING SYMBOLIC ELEMENTS FROM USER-CREATED CONTENTS", filed by the present inventor on Feb. 21, 2010. The disclosures of the above applications are incorporated herein by reference.

BACKGROUND OF THE INVENTION

In the current information age, a big problem most people face is data overload, or information overload. A majority of information is carried by text data, or in the form of text contents such as documents, emails, web pages, news and blog articles, and user reviews, feedback, customer communication data such as survey, text messages, phone transcripts, etc., and the amount of such data is ever increasing day by day.

When information is contained in a large amount of scattered text data, finding the needed information can be difficult. For example, a user booking a hotel room may want to read reviews on the hotel. Some websites that host user reviews can have over hundreds or thousands of reviews written by many users over time for a specific hotel, and it is often virtually impossible for a user to read all the reviews to find the specific information he or she is looking. In some cases, the user may want to know what other users have said about a particular aspect, such as the room service, or the shuttle service of the hotel. But digging out information related to such topics from the numerous reviews can be very time-consuming by conventional search methods. Furthermore, even if the user is able to gather all the reviews on the specific topic of room service, there can be still be numerous comments from numerous users, with some giving the service a positive comment, while others may have given it a negative comment. If the user is particularly interested in knowing what negative comments other users have said about it, it could be more time-consuming to locate such information one by one.

Furthermore, a comment on a specific product or service can occur in many other places in addition to dedicated review websites. For example, some people may comment on their experience in a blog, or on a social network site, or reporters may cite certain opinions in a news article, etc., and in such cases, user comments, whether positive or negative, can be dispersed among a large number of other text contents, and locating specific comments from such sources can require much effort.

In addition to user reviews of products or services that contain user opinions, which may either be positive or negative, other types of information can also be contained in scattered text contents. For example, if a reader is reading a long medical document, and he wants to find out what drugs may have interaction with other drugs, it can also be a very time-consuming task to locate such information in the document one by one even if the reader is knowledgeable in the medical field.

Given such problems, it would be desirable if the computer system that displays the text contents to the reader can also provide a tool that can help the reader locate specific information quickly and accurately. For example, if the reader is reading user reviews of a hotel, it would be much more efficient if the site could provide a tool that lets the reader select a criterion and click a button, and then present all the information the reader is looking for in an easy-to-digest way.

SUMMARY OF THE INVENTION

An objective of the present invention is to provide a system, methods and user interface objects as efficient tools for users to gather information from unstructured text contents with less effort. For example, if the reader is reading a review about a hotel and selects, from a user interface object, the option to "extract or show comments about room service", then the system can gather all comments about room service of the hotel, and group them in a meaningful way such as in a hierarchical structure, and then let the user further select from the user interface for such actions as "show only the positive comments", or "show only the negative comments", etc. Alternatively, the reader can also select "highlight the positive comments" or "highlight the negative comments", etc., to focus on the specific information that the reader is most interested in, saving the reader a considerable amount of time in gathering, organizing and digesting the information that would otherwise be difficult to handle.

In a general aspect, the present invention relates to a computer-assisted method for discovering information in a text content. The method includes tokenizing the text content into tokens as instances of terms, and associating grammatical, semantic, and contextual attributes to the tokens. The present invention further provides user interface object to allow users to specify an attribute and an action type, and to perform the action on the terms in the text content that are associated with the specified attributes.

The actions to be performed on the terms meeting a certain criterion can include extracting, showing or hiding, and highlighting the terms in the content that are associated with the specified attributes.

The extracted terms can be displayed in various view formats, including a topic tree or hierarchical format, a list format, and a word-cloud format. The extracted terms can also be stored and retrieved for display.

In a more specific aspect, context information about the terms having a specified attribute are identified, and the effect of the context on the attribute values of the terms and the scope of the context are identified for the specified actions of extracting, showing/hiding, or highlighting of such terms.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

FIG. 2 is an example of a dataset of terms that share the semantic attribute of being "over-the-counter drug names" in accordance with the present invention.

FIGS. 9A and 9B are examples of selectively displaying extracted terms with a specific semantic attribute in accordance with the present invention.

FIGS. 10A and 10B illustrate an example of a user interface for selectively displaying extracted terms relevant to a topic in accordance with the present invention.

FIG. 12 is an illustration of a user interface that allows a user to selectively highlight terms of a specific attribute in a list format and a cloud format in accordance with the present invention.

DETAILED DESCRIPTION OF THE INVENTION

The present invention provides a system and methods for discovering information in a text content, and provides users with interface objects to act on the discovered information, such as extracting, displaying or hiding, or highlighting or un-highlighting words or phrases in a text content as needed to aid information handling.

In U.S. Provisional Patent Application 61/568,657 entitled "System, Methods, and User Interface for Organizing Document Contents into a Hierarchical Structure and Selective Highlighting of Terms" filed by the present inventor on Dec. 9, 2011, methods are disclosed for discovering information in unstructured or dispersed text data, and for organizing and presenting the discovered information in a novel hierarchical structure format.

In one embodiment, the prominence of a term in the text content is first determined based on its grammatical role and other context information in the content. For example, a word or a phrase that is the subject of a sentence is assigned more prominence value than a word or a phrase in the other part of a sentence. In addition to the grammatical roles, other factors can also be used to determine the prominence score for each term in the content, and terms that have a high score can be extracted from the text content for various uses. They can be separately displayed in a user interface as the topic terms of the content to serve as tags or summaries of the content, or can be further used to build a hierarchical structure to organize and present the key information in the content in a novel and effective way.

The detailed methods for obtaining such a term prominence or tem importance score are disclosed in U.S. patent application Ser. No. 12/972,462 entitled "Automated Topic Discovery in Documents" filed by the present inventor on Dec. 18, 2010, and U.S. Provisional Patent Application 61/299,823, entitled "System and methods for automated document topic discovery, browsable search, relevance ranking, summary generation and display", filed by the present inventor on Jan. 29, 2010, and U.S. patent application Ser. No. 12/782,545, entitled "SYSTEM AND METHODS FOR AUTOMATED DOCUMENT TOPIC DISCOVERY, BROWSABLE SEARCH AND DOCUMENT CATEGORIZATION" filed on May 18, 2010 by the present inventor, and U.S. patent application Ser. No. 13/707,940 titled "AUTOMATED TOPIC DISCOVERY IN DOCUMENTS AND CONTENT CATEGORIZATION", filed on Dec. 7, 2012. The disclosures of the above applications are incorporated herein by reference.

Figure 8:
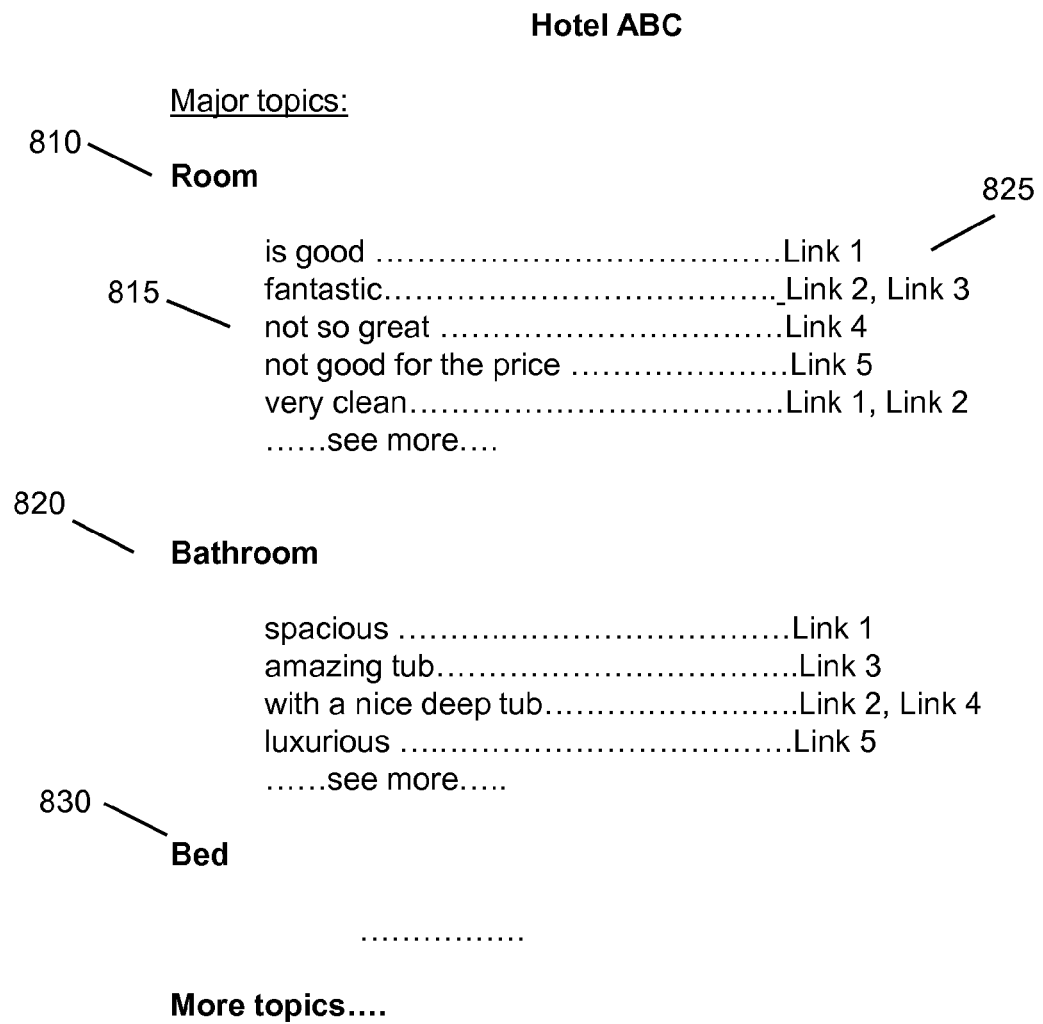
FIG. 8 is an example of a hierarchical information display format with comment terms carrying user opinions in accordance with the present invention.

In the referenced disclosure of U.S. Provisional Patent Application 61/568,657 entitled "System, Methods, and User Interface for Organizing Document Contents into a Hierarchical Structure and Selective Highlighting of Terms" filed by the present inventor on Dec. 9, 2011, one focus is on extracting the key information from a large amount of data, such as hundreds or thousands of user reviews on a hotel or a restaurant, and to present such key information in an easy-to-read format. One example of such a structure is illustrated in FIG. 8, and for ease of illustration, is herein referred to as a topic tree, and will be described later. The purpose of the disclosed methods is to provide a solution to the problem of information overload faced by readers. An ordinary reader is usually not able to quickly find information about particular aspects of a hotel or a restaurant from such a large amount of dispersed data from a brief reading.

In addition to identifying and extracting the key information and presenting such information in various formats (such as a topic tree structure shown in FIG. 8), other methods and user interface objects are also disclosed in the above referenced disclosure for presenting the identified or extracted information in a more effective way, such as selectively displaying or hiding a certain terms in the hierarchical topic tree structure, or selectively highlighting terms representing specific types of information in the original text content.

In the present disclosure, the focus is on more generalized methods for identifying and selectively extracting, displaying, or highlighting certain parts of a text content based on specific attributes of the terms in the text content, for more effective reading and information management.

Figure 1:
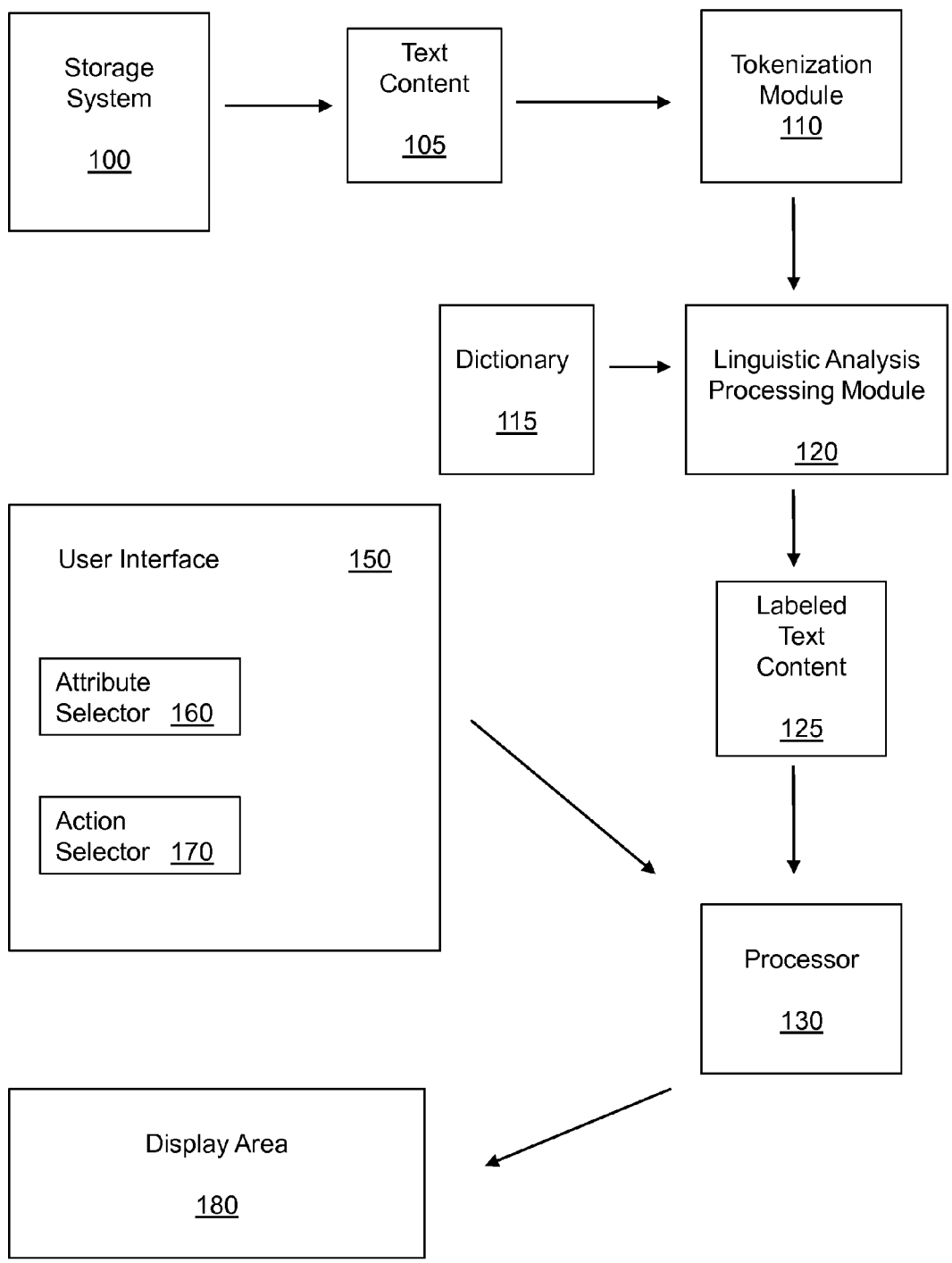
FIG. 1 is an illustration of a system of modules to allow a user to selectively act on the terms in a text content in accordance with the present invention.

FIG. 1 is a system diagram illustrating the general functional components and steps of one embodiment of the present invention.

In FIG. 1, a text content 105, such as a document of any type, is obtained by the system from a computer storage 100, or optionally from a user interface. The text content is then tokenized to produce a plurality of tokens by the tokenization module 110, each of which can be a word or a phrase. In a general sense, a token can be an instance of a term that can have more than one token in the text content, for example, the word "good" may occur in more than one time in the content, and each occurrence is a token instance of the term "good".

Next, a linguistic analysis is performed by the linguistic processing module 120 to identify the grammatical or semantic or contextual attributes of the tokens. In some embodiments, a parser of certain type can be used for the analysis. The parser can use a dictionary 115 to aid its analysis. In some other embodiments, certain attributes can also be directly obtained by a dictionary lookup. The linguistic analysis can also detect the topics contained in the content based on the grammatical or semantic or other attributes of the terms in the content, and associate the content with a specific topic domain, and retrieve additional domain-specific dictionaries or datasets for further processing.

Then, the grammatical, semantic, contextual, or topical attributes obtained from either the parser, or direct dictionary lookup can be attached to the tokens in the text content to form labeled text content 125.

In some embodiments, the attributes attached to the term are embedded in the text content by a pre-processing step, such that words or phrases in the text content are labeled with their attributes in a certain way that can be interpreted by a display tool such as a web browser or other document viewers. In some other embodiments, the attributes are assigned to the words or phrases in the text content by the central processor in real-time when receiving a user indication.

Furthermore, the user interface objects provided by the system can display one or more attributes or a description of the attributes in user interface 150 to the user, and for the user to select for an action, and attribute selector 160 accepts the user selection as input to the system. Such attributes can be grammatical, semantic, contextual, or topical, etc.

Another user interface object such as action selector 170 provides choices of supported actions to the user, and accepts the user selection as input to the system. The choices of actions provided to the user can include extracting, displaying or hiding, or highlighting the terms or tokens in the content that have the selected attributes.

In some embodiments, the two types of selectors 160 and 170 can be combined or integrated into a single user interface object. For example, users can act on a button labeled "extract terms that are drug names", in which the "extract" is an action, and "drug names" is an attribute or attribute name.

When a user selects an attribute and an action, the selections are registered by processor 130, which retrieves the labeled text content if the text has been pre-processed and displays the results in display area 180. In some embodiments, processor 130 can register the user selections and send the selection information to linguistic analysis processing module 120 to perform the desired actions on the text content in real-time, and the results are then displayed in area 180.

In some embodiments, a dictionary can be used to lookup the grammatical or semantic or other attributes of a term in the linguistic analysis.

FIG. 2 illustrates an example of such a dictionary that can contain words or phrases that are names of some over-the-counter drugs, or have the semantic attribute of being the names of "over-the-counter drugs".

Such a dictionary or word list can be compiled either manually or automatically or semi-automatically using a machine-learning method of certain type. In the real world, text documents are most of the time associated with a specific domain, or a topic domain, such as politics, finance, medicine, law, technology, education, commerce, product/service review, restaurants, hotels and lodging, etc., and each domain can have its own domain-specific dictionaries compiled and stored in accessible databases. When text contents are displayed to the user, the user interface object such as the ones described above can also be made available to the user, and the user can select an attribute-based criterion and then perform a selective action on the terms in the content as an efficient way of discovering and locating needed information.

In some embodiments, the text content is first analyzed to determine its topics based on the terms used in the content, such as using the topic discovery methods disclosed in the referenced disclosures, and then the content is associated with a topic domain based on the major topics in the text content. A domain-based dictionary or word list for one or more pre-defined or desired semantic attributes can be pre-compiled, and stored in an accessible database or knowledge base, which can be stored either locally or on a remote or cloud-based computing and storage systems.

In some embodiments, the system stores certain domain-specific dictionary datasets, each containing terms that are associated with one or more domain-specific attributes, such as the attributes related to the medical or legal domain. In some other embodiments, the system can store a wide range of dictionary datasets across multiple domains to serve general requests.

When a dictionary or word list for semantic attributes of terms is available for the domain that the text content is associated with, the system can retrieve such datasets, and perform a match for each term in the dictionary or for each term in the text content, and the user-selected action can be performed on the matched terms, whether the action is to extract the terms, or to display or hide the terms, or to highlight or un-highlight the terms in the content.

Selectively Extracting Terms Based on Term Importance

Figure 3:
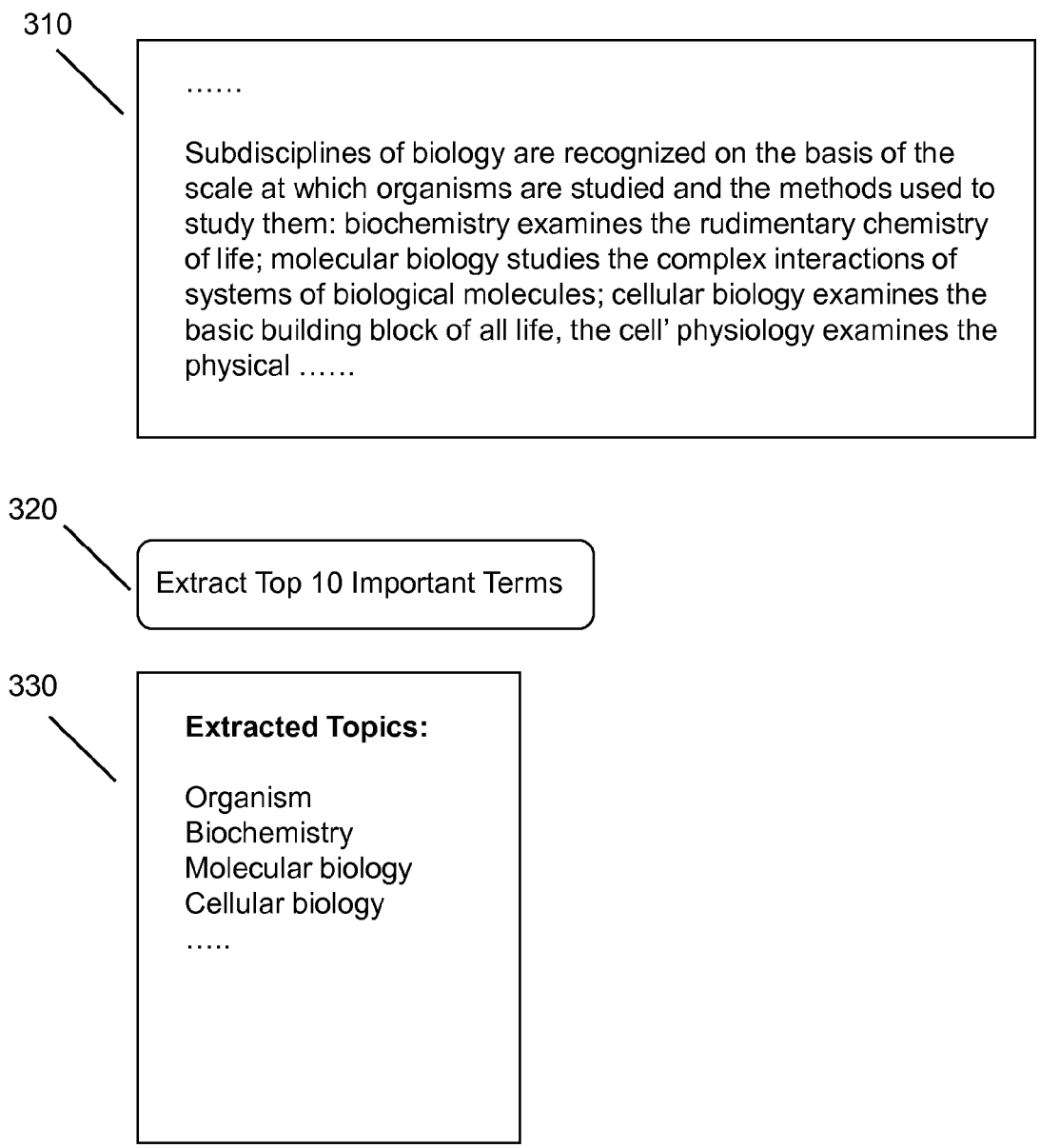
FIG. 3 is an illustration of a user interface that allows a user to selectively extract and display important terms that represent the topics of a text content in a list format in accordance with the present invention.

In one embodiment, the linguistic processing module can assign importance scores to the terms in the content based on the grammatical, or semantic, or contextual attributes of the token instances of the term. In this embodiment, terms with an importance score above a threshold can be extracted to represent the main topics of the content, such as the top 10 terms that have the highest score among all the terms in the content. FIG. 3 illustrates an example of the embodiment. 310 is an exemplar text content about biology, and terms such as "molecular biology", "cellular biology", "organism", "biochemistry", etc., are identified by the linguistic processing module as important terms in the content. One or more user interface objects can be used to display a selectable criterion together with an action, or display them separately. 320 is a selectable buttons to allow the user to select either "extract top 10 important terms", or "display top 10 important terms separately", etc. In this example, the important terms are extracted and displayed in a separate area 330 in a list format in connection with the original content. This way, users may only need to take a look at the important terms before deciding whether to spend more time to read the entire content.

The detailed steps in assigning importance scores to terms in the content are disclosed in the above-mentioned referenced disclosures, and are not the focus of the present disclosure. As has been described above, the focus of the present invention is to provide a system and methods and user interface for such selected actions on specific terms in a text content that meet a specified attribute-based criterion.

Figure 4:
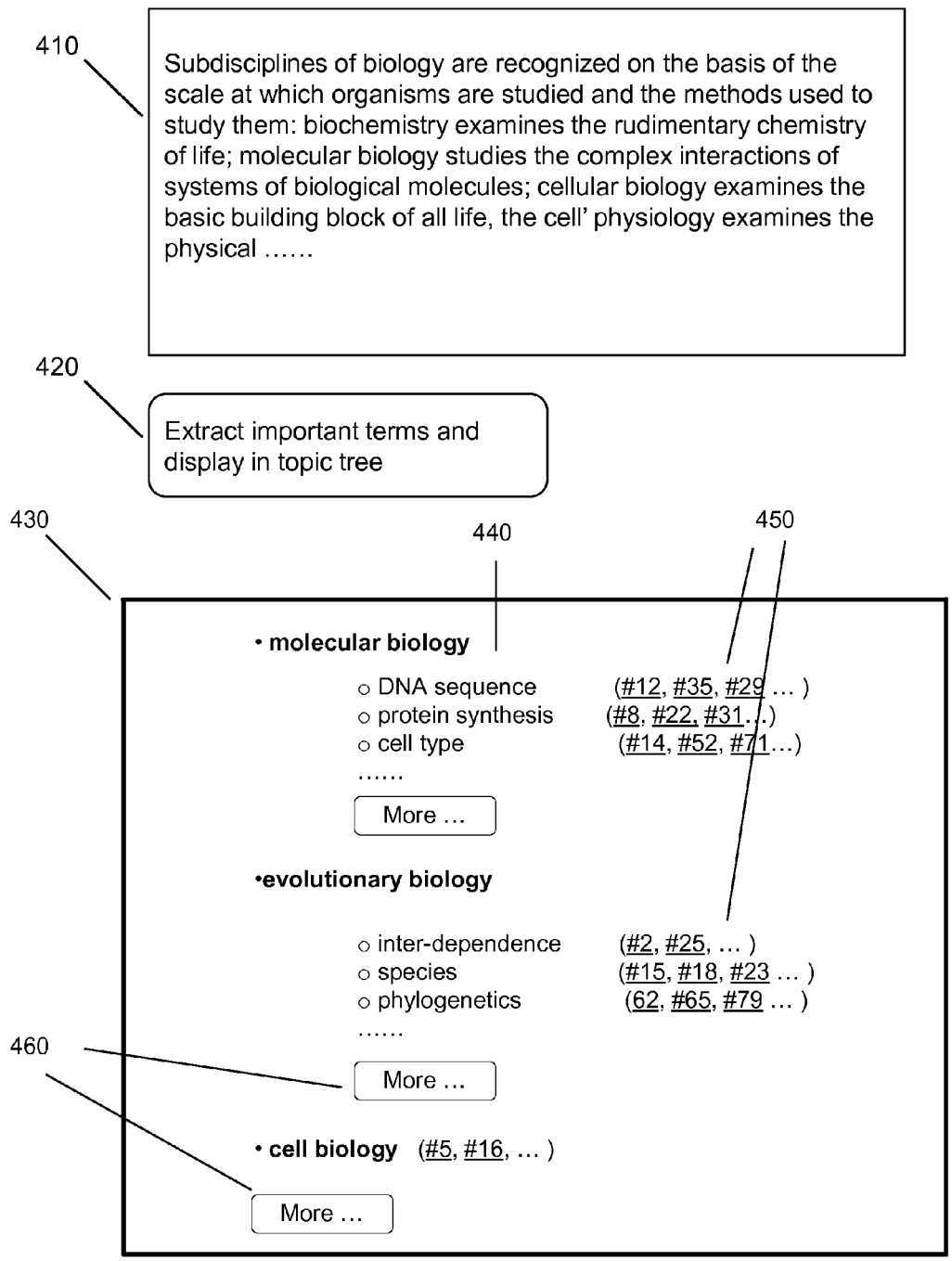
FIG. 4 is an illustration of a user interface that allows a user to display the extracted terms in a topic tree format in accordance with the present invention.

As is disclosed in the referenced disclosures, important terms of a text content can be extracted and further used to create a topic tree such as the one illustrated in FIG. 4. While the detailed steps in creating such a topic tree is disclosed in the referenced disclosures, the present invention provides additional methods and user interface objects to enable users to selectively display part of a topic tree as a novel format of presenting the key information in the content.

FIG. 4 is an example illustrating the user interface for users to select an action of extracting important terms and display a topic tree or display the extracted terms in the a hierarchical structure. 410 is an example of part of the text content taken from a Wikipedia article about biology. 420 is a selectable user interface object provided by the present invention with an exemplar label of "extract important terms and display in a topic tree". Once the user selects such an action, a topic tree 430 is displayed to the user, in which topics and subtopics and link to the text segments are displayed.

Figure 5:
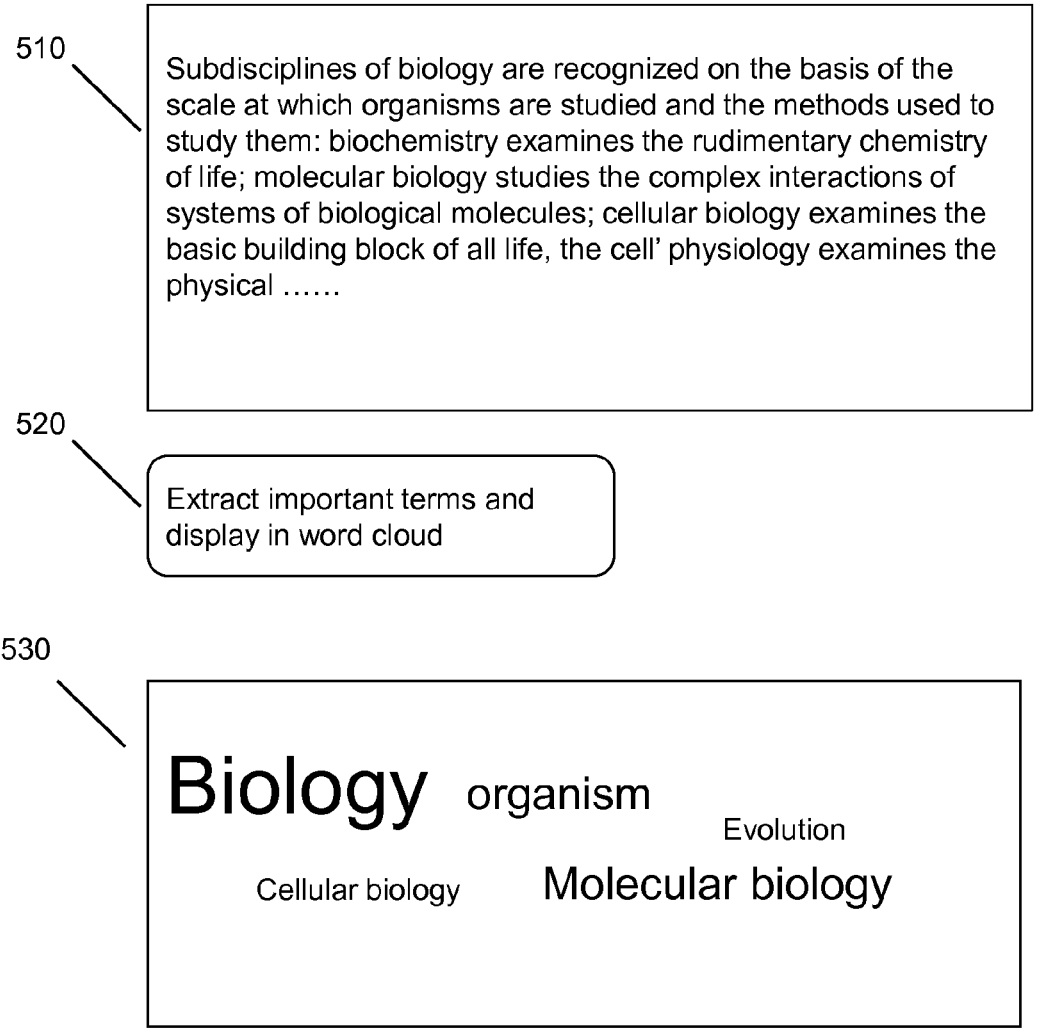
FIG. 5 is an illustration of a user interface that allows a user to display the extracted terms in a word cloud format in accordance with the present invention.

In some embodiments, in addition to the list format and topic-tree format, the important terms can be extracted and displayed in other formats as well. For example, user interface objects can be provided for users to select such actions as "extract important terms and display in a word-cloud format" or "display the topic 20 important terms in a word cloud format", etc., such as the example shown in FIG. 5.

The above examples are focused on the term importance as an attribute for selective term extraction. In addition to using the topical attribute of term importance as a criterion for extracting or displaying specific terms, in some embodiments, the criteria can be specific grammatical, semantic or contextual attribute or attributes.

The grammatical attributes of a term can include its grammatical roles such as whether the term is the subject of a sentence, or the predicate of a sentence, or part of the predicate of the sentence, or an object of a verb, or a predicative or a complement, etc. For example, in the sentence of "Digital cameras are convenient", the phrase "digital camera" is a subject, the phrase "are convenient" is a predicate, and the word "digital" or "camera" is a subcomponent of the phrase "digital camera", with "digital" being a modifier and "camera" being the head of the phrase.

Words also have the attribute of what is known as "parts of speech", for example, in above sentence, the word "digital" is an adjective, and the word "camera" is a noun.

In addition to the grammatical attributes, words or phrases carry meanings Some words refer to things or concepts, such as the names of various things in the world, and some words refer to an attribute of things, such as whether a person is "tall" or is "a student", and some words can carry an opinion, such as whether something is "good" or "bad". The word "good" usually carries a positive opinion, which is also one of the meanings that can be carried by the word "good". The word "bad" carries a negative opinion, among its other possible meanings Meanings of a word or a phrase can also be named as "connotation" or "semantic attributes". For example, the basic meaning of the word "aspirin" is a drug, or the name of a drug. It can have other semantic or conceptual attributes such as being a pain-reliever, or an over-the-count drug, etc.

There are different types of semantic attributes, and each type can have a value. For example, "opinion" can be a semantic attribute type, and "positive" or "negative" can be a value of the semantic attribute of "opinion". "Drug" can be a type of semantic attribute, and "aspirin" can be a value of this attribute.

Terms in a text content can also have contextual attributes, such as whether a term is the subject or object of a particular verb, or whether the term is a modifier of a specific noun, or whether a term is before or after or near a specific word, etc.

Context can also change the inherent meaning of a word or phrase. For example, when the word "enough" is used alone, it means "plenty of", but when it is used with certain other words, such as in "barely enough", the entire phrase can mean "not enough".

The grammatical, semantic, or contextual attributes of terms in a text content can be identified by the linguistic processing module, or in some embodiments, by dictionary lookup.

Once an attribute is identified, it can be made available for selective actions such as extracting, displaying, or highlighting, etc., to achieve more effective information management results, as described above with topic term extraction and display.

Selectively Extracting Terms Based on Semantic Attributes

For ease of illustration, in the following description, the word "term" or "terms" is often used in place of "words or phrases", while the two may be interchangeable. A term can contain one or more words or phrases, and in some cases, it can also mean one or more sentences. In general, a term in a text content can occur more than once, with each occurrence being a token instance of the term.

In one embodiment, the text data are user reviews on products or services.

A typical characteristic of such contents is that users express opinions on certain aspects of the products or services. For example, a user review on a hotel may contain expressions such as "The room was extremely clean, but the bed was too soft for my taste", or "The bathroom was spacious", or "Their food was not so good, and the front desk did not respond to our request promptly." Opinions can usually be categorized as being positive or negative, or neutral. The following description mainly uses examples based on the semantic attribute of "opinion" on products or services for ease of illustration.

As is mentioned above about the problem of information overload, in certain types of products or services, such as hotels and restaurants, there can be hundreds or thousands of reviews for an individual product or service on certain websites. If a reader wants to find information relating to a specific aspect of the product or service, such as the room service of a hotel or a special dish served by a restaurant, the user may need to dig in the hundreds or thousands of the reviews or perform a keyword-based search for such aspects of the product/service, provided that the search function is available and the results are manageable.

When the amount of user review data is too large, an effective way for readers to obtain key information quickly is for a computer system to first identify the words or phrases that carry opinions on certain aspects of the product or service, and then provide user interface objects for readers to either extract, display, or highlight the words or phrases that carry the specific information the reader is most interested in, such as the words or phrases that carry positive or negative opinions of the room, or bed, etc., of a hotel, or the food, service, price, etc., of a restaurant, or hide or un-highlight the part that is not of major interest.

Figure 6:
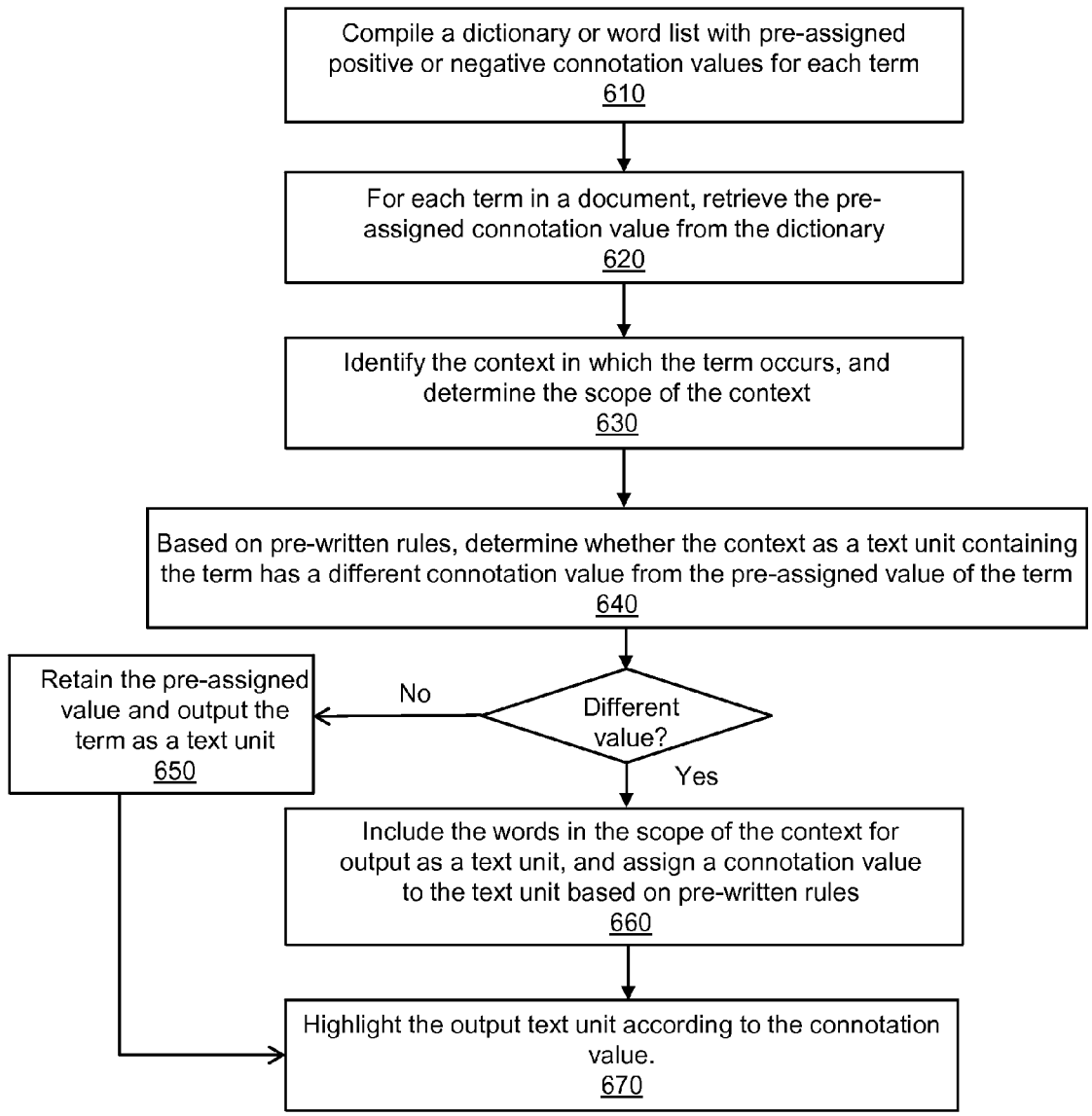
FIG. 6 is a flowchart detailing steps of associating attribute values to terms in a text content and determining the context of terms in a text content, in accordance with the present invention.

In some embodiments, an opinion-specific dictionary is used. FIG. 6 is an illustrative diagram for identifying the terms that indicate an opinion as their semantic attribute. In step 610, a dictionary or word list is first compiled to store the pre-assigned attribute type/value for each term to indicate whether the term carries a positive, negative, or neutral opinion. For example, in English, the word "good" can exemplarily be put in a positive word list, or be assigned a value of 1 to indicate that it inherently represents a positive opinion, and the word "bad" can exemplarily be put in a negative word list, or be assigned a value of −1 to indicate that it inherently represents a negative opinion, and the word "many" can exemplarily be put in a neutral word list, or be assigned a value of 0 to indicate that it inherently represents a neutral or no opinion. The list can be compiled manually by a human editor, or automatically by a computer program using some type of machine-learning methods, or both. If a single list is used for both opinion values, the value can exemplarily be between +1 and −1, to indicate the positive or negative semantic attribute, respectively, or +5 and −5 for a finer distinction. Once the dictionary is compiled, each term in the document is matched against the dictionary. If a term has a match, its pre-assigned semantic attribute type/value is retrieved from the dictionary in step 620. If a term is not found in the dictionary, it can be assigned a default value of zero for being neutral.

Again, the detailed method of compiling this list is not the focus of the present disclosure.

Once the semantic attribute of opinion is identified for each term, a user interface object is provided for users to selectively extract terms carrying either positive or negative or neutral opinion.

Figure 7:
FIG. 7 is an example of a user interface object that allows a user to selectively extract terms that have a specific semantic attribute of "opinion" in accordance with the present invention.

FIG. 7 is an example of a user interface object that allows the user to selectively extract terms that carry a specific opinion. Interface options such as "extract positive opinion", or "extract negative opinion", etc., are provided. In FIG. 7, the user interface object is a dropdown menu with options. User interface object can also be a set of radio buttons, a slider, or any sort of object that allows a user to selectively indicate an option.

The terms so extracted can be used in many ways.

One way is to use such terms to create a report, such that, the management of the business being reviewed can quickly have an idea about what is being said about their products or services, without spending much time reading all the user reviews that are often in a unmanageable quantity. For companies that receive a large number of customer feedbacks on their products or service, or questions received by technical support, the management of the company may want to know what or how many negative comments are there in the user feedback, or what type of problems that are reported most often. Hiring a large human labor force to manually process the data can be costly, but with the present invention, the system can automatically gather all the related information, and extract such information from a large number of text data, and then be used in a report for easy digestion or further analysis.

In some other embodiments, terms having specific attributes can be used to further build a topic tree such as the example shown in FIG. 8 for more convenient information management.

For example, for a hotel review, words or phrases meeting the criterion of having a high term importance score can first be extracted as described above with extraction based on topical attributes. When a large amount of data is processed as a whole, commonly used terms will likely receive a high importance score assigned by a linguistic processor. Based on the experiment data by the present inventor, for a number of exemplar hotel review articles, terms such as "room", "bathroom", "bed", "price", etc., are often the topics that can be identified and extracted. Then, on top of these topic terms, segments of user comments meeting the criterion of carrying an opinion and related to the extracted topics can further be identified and extracted for each of the common topics.

FIG. 8 is an example of such a topic tree with the second-level nodes being the extracted terms that carry an opinion about the first-level nodes as major topics.

In FIG. 8, there are two levels of nodes in the tree structure. The first-level nodes such as 810, 820, 830 are major aspects of a hotel, or topics of a hotel review, that can be extracted based on the topical attributes or term importance as described above, or can be pre-defined. For each first-level node as a topic, second-level nodes can be created by extracting the comments related to the first-level topics, such as shown by 815. Also as described above, the detailed steps of associating the comments with the topics are disclosed in the above-mentioned referenced disclosures. When extracting the comments, in addition to the semantic attribute of "opinion", grammatical attributes such as being part of the predicate, or being a predicative of a subject represented by the corresponding topic term can also be used for the extraction of such terms. In FIG. 8, it is shown that under the topic of "Room" (810), some comments are positive, such as "fantastic", and some are negative, such as "not so great", and most of them are in the predicate that is associated with topic terms as the subject. The comments can be linked to the original text in the content, such as shown by 825.

The advantage of such a topic tree based on the extracted terms that meet user-specified semantic or grammatical criteria can provide an easy way to gather the key information that can otherwise be buried in a large amount of data.

In some embodiments, whether the terms are extracted based on the term importance, or on the semantic or other attributes, the extracted terms can be stored in a data file, and later be retrieved for display. The present invention also provides user interface objects for users to selectively display such extracted terms in a specific view format, such as a list format, or tree format, or a word-cloud format. For example, selectable user interface objects with labels such as "display the top 30 important terms in a word cloud format", or "display the terms carrying positive or negative opinions in a tree format", etc.

Selectively Displaying or Hiding Terms Based on Semantic Attributes or Term Importance As can be seen from the example illustrated in FIG. 8, user comments can carry opinions. Some are positive, such as "fantastic", while others can be negative, such as "not so great". When the list of comments is too long, or the number of second-level nodes is too large, users can still have the problem in quickly finding a particular comment, or in finding a pattern of the comments as to how good or bad the room is.

In some embodiments, the present invention further provides a method for selectively displaying or hiding terms that carry a particular semantic attribute value, such as whether a term is expressing a positive opinion, or a negative opinion, or a neutral opinion, or whether a term is an important term in the text content.

As described above, terms of a particular semantic attribute such as a particular opinion or terms above an importance threshold can be extracted from the text content, but not all of the extracted terms need to be displayed in the user interface, depending on the user needs. For example, in some cases, a user may be particularly interested in reading the positive comments, or negative comments, or there are too many extracted terms to be displayed. In such a case, the present invention provides another effective method for selectively showing or hiding terms based on specific attribute values.

For example, in the case of the topic tree exemplified in FIG. 8, a user interface object can be provided for the user to selectively display only the positive comments, or only the negative comments, or both. FIGS. 9A and 9B illustrate an example of such selective displaying. In FIGS. 9A and 9B, a set of user interface objects 910 is displayed and the user can select either "show positive comments only", or "show negative comments only", or "show all comments". In FIG. 9A, only the positive comments on the second-level nodes of FIG. 8 are displayed according to the user selection. In FIG. 9B, only the negative comments on the second-level nodes are displayed according to the user selection. The set of user interface objects 910 in either FIG. 9A or FIG. 9B can be a dropdown menu, clickable buttons, radio buttons, or any sort of interface objects that allow a user to specify an option.

One advantage of this selective showing/hiding of terms based on semantic attributes is that users can not only quickly find the information that is of most interest, but also find a pattern of the comments that share the same semantic attributes, such as what all positive comments are about, and what all negative comments are about. This is also particularly valuable for the management of the business to act on the user feedback to improve their business. Without the selective displaying or hiding, it can be very difficult to locate or gather the comments of similar nature dispersed in various parts of a large number of review articles, and to see a pattern from the comments.

In some embodiments, when the extracted terms are in a tree format, with the first-level nodes showing the major topics and the second-level nodes show comments on the corresponding topics, all the second-level nodes can be hidden by default when displayed to the user, such that, only the topic terms as the first-level nodes are displayed at first. User interface objects are provided for the user to select a topic as an action of selectively displaying the second-level modes, which, in this example, are comments on the selected topic. FIGS. 10A and 10B are illustration of the display format. In FIG. 10A, only the topics of a hotel review as the first-level tree nodes are first displayed in a list format, with their related comments hidden. Users can select a topic in the list, and the related comments can be displayed as shown in FIG. 10B. A user interface object can be provided such as one with a label of "select a topic to see comments", or "view comments by topics", etc. This selective display method can use the terms that are previously extracted using a semantic or other attributes as a criterion, and stored in a data file. It is functionally equivalent to "display comments for the selected topic", in which the action is "display", and the terms to be displayed have the semantic attribute of being the comments for the selected topic.

This is especially a useful feature for many product or service review sites to enhance user experiences, as well as other sites. Users can first take a look at what the major topics contained in the content are, and then selectively display the related comments or other information about a selected topic.

Selectively Highlighting Terms Based on Semantic Attributes or Term Importance

Figure 11:
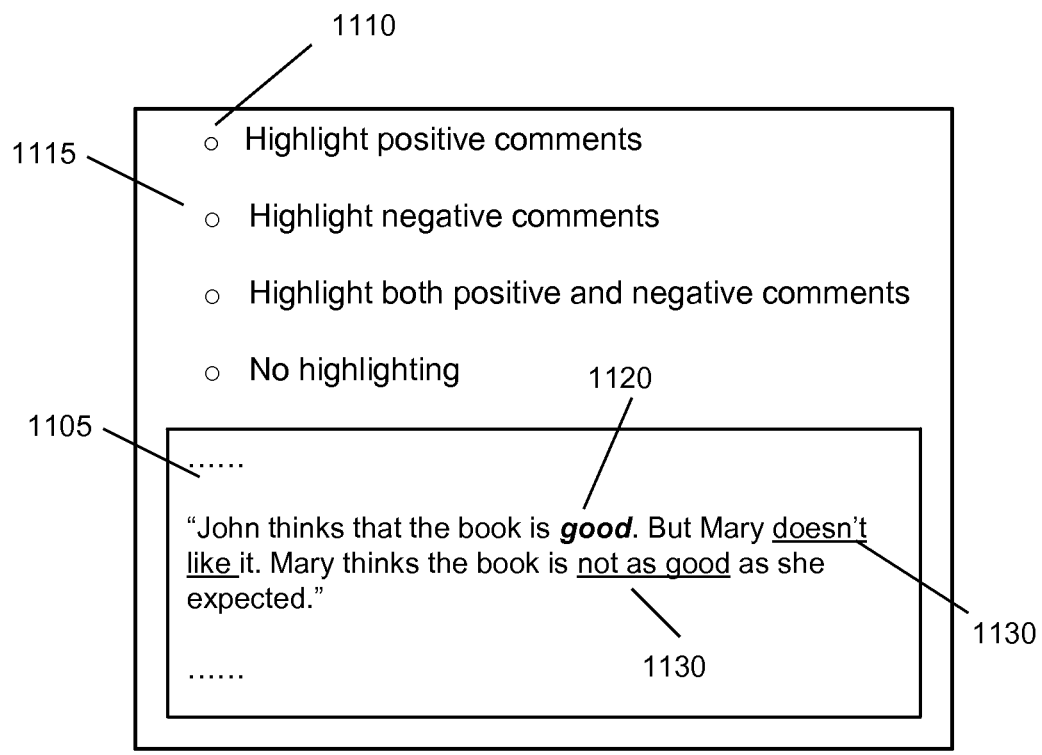
FIG. 11 is an illustration of a user interface that allows a user to selectively highlight terms of a specific attribute in a text content in accordance with the present invention.

Again, with the example of a topic tree, in some embodiments, when the number of identified or extracted terms is moderate, instead of selectively displaying or hiding terms with a particular semantic attribute, users can also selectively highlight or un-highlight such terms based on their semantic attribute, or attribute type or value. FIG. 11 is an illustration for selectively highlighting only the positive opinion in the exemplar hierarchical structure. An exemplar user interface object is provided that displays a description of the semantic attribute, such as the "positive opinion", and a desired action for the system to perform on terms that have the specified semantic attribute, such as the action of highlighting, or un-highlighting, etc. As is shown in FIG. 11, if button 1110 is selected, the term "good" (1120) can be highlighted in bold font, and if button 1115 is selected, the term "not as good" (1130), etc., can be highlighted by an underline. The bold font and underline are only examples for illustration purposes. Other methods such as different colors can also be used to achieve the visual effects of highlighting.

As is shown in FIG. 11, in addition to the exemplar hierarchical structure for illustration purposes, the system and method of the present invention can also be applied to regular formats of text contents. For example, when the system is displaying a document to the reader, a user interface object can be displayed to the reader at the same time. The user interface object can display a description of the semantic attributes of terms in the text content as a criterion for selective actions, such as extraction, displaying, or highlighting, and the reader can indicate to the system which action to perform on the terms that have the specified semantic attributes. For example, when the system is displaying a medical document to the reader, a user interface object displayed at the same time can let the reader select a pre-specified semantic attribute and an action type, such as "names of drugs that interact with other drugs", or "names of drugs that are FDA approved"; and also select an action for the system to perform on the terms in the content that meet the criterion, such as "extract", or "highlight" or "un-highlight", etc. Once the desired action is performed by the system, the reader can quickly focus on these terms that carry the information the reader may be most interested in.

In addition to the regular text content and the topic tree format as described above, the action of selectively displaying or highlighting can also be applied to other data display format, such as the list format and word-cloud format. For example, whether it is in a list or a cloud format, user interface object can be provided to selectively display or highlight terms that carry either a positive opinion, or a negative opinion, or a neutral opinion, or terms that meet an importance criterion. FIG. 12 shows examples of these applications. In FIG. 12, if button 1210 is selected, the term "amazing story" (1220), or (1250) can be highlighted in bold font, and if button 1215 is selected, the term "not as good" (1230), or (1260), etc., can be highlighted by an underline.

Selectively Extracting, Displaying, Highlighting Terms Based on Context

In some embodiments, the context of the terms in the text content can be analyzed, and the extraction, display or hiding, or highlighting of the terms can be based on the context, in addition to the individual terms.

In the present disclosure, one focus is on identifying the context that may change the inherent connotation of a term, and determine the scope of the context to be extracted, displayed, or highlighted to the reader. Going back to the example of opinions, when the word "good" is used alone, it usually indicates a positive opinion; and when it is used in a context of "very good", the entire phrase still represents a positive opinion. However, when it is used with another word such as "not", as in "not good", or "not very good", the contextualized phrase of "not good" or "not very good" represents a negative opinion. If only the word "good" is looked up from the dictionary without also identifying the context and a search for the word "good" is conducted in the document, the phrase "not very good" will still be treated as indicating a positive opinion, which would be incorrect.

Continuing with the illustration in FIG. 6 as described above, which is an illustrative diagram for a method of identifying the terms together with their context that carry different semantic attributes, initial attribute values are assigned from dictionary lookup in steps 610 and 620 before context information is checked. In addition to this, the present disclosure uses linguistic rules to identify the context (Step 630) and determine whether the context affects the pre-assigned value or not (Step 640). If the context does not change the pre-assigned attribute value, then the original pre-assigned value is retained and the term is output for extraction, display or highlighting (Step 650). If the context as a text unit indicates a different opinion from the pre-assigned value of the term, then the scope of the context is identified as a larger text unit containing the original term (Step 660), and words in the context scope are assembled into a string for output as a whole for extraction, display, or highlighting, and to correctly and accurately indicate the opinion of the contextualized text unit to the reader.

For another example, if the original text is "It is not good", the text unit of "not good" will be identified as indicating a negative opinion, and will be treated as the scope of this context, and will be output for highlighting as a unit; if the original text is "nothing there seems to be good", the entire sentence of "nothing there seems to be good" is treated as indicating a negative opinion, and also as the scope of this context, and will be output for action as a unit; if the original text is "I don't think it's good", either the entire sentence is treated as indicating a negative opinion and as the scope of this context, and will be output for highlighting as a unit, or part of the sentence such as "don't think it's good" is treated as the scope of this context, and will be output for action as a unit. This way, the output will not be the word "good" alone as indicating a positive opinion, but will correctly indicate that the contextualized text unit represents a negative opinion.

The above examples are based on negation of the original meaning or semantic attribute value. Negation is only one of the context types that can make an attribute value such as an opinion different from or opposite to the pre-assigned value of a term without the context. Other types of contexts can also have a similar effect. For example, when people usually think that "high quality" is good, and "low quality" is bad, the word "high" or "low" alone cannot always determine whether the resulting connotation is positive or negative. For example, people usually know that "high blood pressure" is not good, but "low blood pressure" is not a good thing, either; and what is good for blood pressure is "normal blood pressure". Thus, different rules must be used to handle different cases. While details of writing such pre-written rules are not a focus of the present disclosure, the methods disclosed in the present invention can use such rules to identify the resulting attribute value for different context types, and identify the corresponding scope of context for extraction, display or highlighting (Step 670).

As is shown in FIG. 11, the person John gives a positive opinion on the book as being "good", and the term "good" is highlighted in bold and italic font style (1120). On the other hand, Mary has a different opinion on the same book. In this case, even though the word "like" has a pre-assigned positive attribute value, the context of the term "like" is identified, and is determined that the context of "doesn't like" as a text unit has a negative attribute value, opposite to the pre-assigned positive value for the term "like". Using a pre-written linguistic rule, the scope of the context is identified to be "doesn't like" as a text unit, and the entire text unit of "doesn't like" is highlighted by an underlined font style (730), different from the positive word of "good". Furthermore, in the third sentence of "Mary thinks the book is not as good as she expected", even though the word "good" has a pre-assigned positive attribute value, the present invention identifies the context of the word "good" to be a negation context, and the scope of the context is determined to be "not as good" and is treated as a single text unit or a single term. In the output, the text unit of "not as good" is highlighted also with an underlined font style to distinguish it from the positive instance of "good" in the same document (1130).

While the exemplar buttons in FIG. 11 only show the action of highlighting, the scope of the context is also available for other actions of extracting, showing or hiding, etc. As is described above, in the case of a topic tree structure with different levels of nodes, the node terms can be either displayed or highlighted according to their semantic and grammatical context, or the scope of such context.

It should be noted that in modern-day user interface, certain information in the content can be easily highlighted either by default, or by pre-configuration as user preference, or by a process such as highlighting certain specified keywords, or highlighting keywords that match a search query in a search result page, or some other criteria. However, users are not able to dynamically and selectively extract, display or hide, or highlight part of the contents that contain specific information, especially such information that does not directly match a keyword in the content, such as a stretch of text that indicate a positive or negative opinion, or other type of grammatical or semantic attributes or properties of an object represented by a term. For example, certain web pages automatically highlight addresses or phone numbers or names of places contained in a page or email, but users do not have real-time control to select which information to extract, display or hide, or highlight or un-highlight, and the statically highlightable information is limited to predefined items such as address or phone numbers, etc., based on string pattern matching, rather than the semantic attribute match for the linguistically meaningful units such as positive or negative opinions and their contexts, or based on domain-specific topics. One of the novelties of the present invention is to first identify the semantic attributes of terms as well as their context scope in the document, and then providing user interface control objects for users to dynamically and selectively extract, display or hide, or highlight or un-highlight terms and their contexts that carry specific information to serve their specific needs.

As is described above, in addition to topical and semantic attributes, other types of attributes can also be used for such selective actions, such as the grammatical attributes, or contextual attributes. For example, a user interface object can let the user select "highlight or extract the subject terms with the word "follow" as its verb", or "highlight or extract the object terms with the word "take" as its verb", or "highlight or extract the object terms with the word "student" as its subject", etc., and perform the corresponding action to display the text content in a way that meets the specific need of the user.

The above disclosed method of identifying and assigning attribute type or value of a term in a text content or a node name in a category tree, or in a list or cloud format, and providing user interface objects for users to decide whether or how to display or highlight terms or text units of a specific connotation or attribute type or value is not limited to the specific document type of product/service review as exemplified above. The method can be generally applied to other types of documents and other types of attributes as well, such as briefly exemplified above with medical documents.

User Interface Objects for Specifying the Attributes and Action

An important part of the present invention is the user interface object and its function in displaying a pre-defined attribute as a criterion for extracting, displaying or hiding, or highlighting terms that meet the criterion, without user typing in the criterion, or without the need to match a keyword in the criterion with a keyword in the content, as well as its function of receiving user input for a selected action to perform on the terms in the text content that carry the specified attributes. For example, as described above, when reading medical documents, a user interface object can be provided to allow the user to select such actions as "highlight and extract drug names that have an interaction with other drugs", or "highlight and extract drug names that can reduce arthritis symptoms", etc. and in addition to highlighting or un-highlighting and extracting, user can also display the terms in a user interface in a way that the user can copy/paste or record for use elsewhere, such as assembling them to create a report.

In addition to providing a user interface object for displaying a specified attribute as an action criterion, in some embodiments, the system can allow the user to enter a criterion using natural language, and then the system can interpret the intended criterion, and perform a similar operation.

The above are only examples of the methods and applications. The presently disclosed system and methods and user interface can also be applied to many other environments without deviating from the spirit of the principles and the methods described above.

What is claimed is:

1. A computer-assisted method for discovering information in a text content and extracting and presenting the information, comprising:

obtaining, by a computer system, a text content comprising one or more words or phrases or sentences, each being a term or an instance of a term;

selecting a first semantic attribute and a second semantic attribute for users to select from, wherein the first semantic attribute or the second semantic attribute includes an attribute type or attribute value; wherein the first semantic attribute is associated with a first name or description, and the second semantic attribute is associated with a second name or description;

identifying a words or phrases in the text content associated with the first semantic attribute or the second semantic attribute;

displaying an actionable user interface object, wherein the actionable user interface object is associated with a label representing the first name or description or the second name or description;

allowing the user to select the first name or description or the second name or description as a user-specified or user-desired attribute; and performing, by the computer system, an action on the word or phrase associated with the user-specified or user-desired semantic attribute, wherein the action includes at least extracting, displaying, storing, showing or hiding, or highlighting or un-highlighting the word or phrase.

2. The method of claim 1, wherein the first semantic attribute and the second semantic attribute are associated with a shared semantic category or in the same semantic category.

3. The method of claim 2, wherein the first semantic attribute represents a meaning that is in contrast with the second semantic attribute in the shared semantic category, wherein the shared semantic category includes at least the semantic category of sentiment or opinion, wherein the contrast includes at least a positive opinion versus a negative option or a neutral opinion.

4. The method of claim 1, wherein the first semantic attribute and the second semantic attribute are not named entities, or are not a relation between named entities; or if the first semantic attribute or the second semantic attribute is associated with a pattern of words or symbols, then the first semantic attribute or the second semantic attribute is not determined from a dataset, wherein the dataset includes an ontological database, wherein the symbols comprise non-alphabetic characters.

5. The method of claim 1, wherein the first semantic attribute or the second semantic attribute represents a threshold value of importance of a word or phrase in representing a topic or information focus in the text content.

6. The method of claim 5, wherein the importance of a word or phrase is represented in the format of a term importance measure, wherein the term importance measure for the word or phrase is determined based at least on a grammatical roles associated with the word or phrase in the text content.

7. The method of claim 1, wherein the steps of associating a word or phrase with the first semantic attribute or the second semantic attribute comprise matching the word or phrase in the text content with a word or phrase in a dataset or dictionary, and initially assigning the word phrase with an initial or default semantic attribute, wherein the initial or default semantic attribute is changed by a different word or phrase surrounding the word or phrase, the method further comprising:

identifying the different word or phrase surrounding the word or phrase, and determining the changed attribute based on the different word or phrase.

8. The method of claim 6, wherein there are one or more of the different words or phrases representing the context of the word or phrase, wherein the context has a scope comprising the one or more different words or phrases in addition to the word or phrase, wherein the words or phrases in the entire scope collectively represent the semantic attribute, the method further comprising:

identifying the scope of context of the word or phrase, and performing the user-selected action on the entire scope.

9. The method of claim 1, wherein the selected action includes at least the action of extracting, the method further comprising:

allowing the user to select a view format for the extracted terms, wherein the view format includes at least a list format, or a tree or hierarchical format, or a cloud format; and displaying, in the user interface, or storing in a file, the extracted words or phrases according to the selected view format.

10. The method of claim 1, when the selected action is the action of showing or hiding, and two or more words or phrases are associated with the selected semantic attribute, the words or phrases are shown or hidden as node names in a tree format, or words or phrases in a list format, or words or phrases in a word cloud format.

11. The method of claim 1, when the selected action is the action of highlighting or un-highlighting, and two or more words or phrases are associated with the selected semantic attribute, the two or more words or phrases include words or phrases in the text content, or extracted words or phrases as node names in a tree format, or words or phrases in a list format, or words or phrases in a word-cloud format.

12. The method of claim 1, wherein the text content includes a word or a phrase or a sentence or paragraph or a document, or a collection of a plurality of documents, wherein a document or a collection of a plurality of documents includes any content containing text including a file, a web page, a blog, a note, an email, a comment residing on a website or a social network site or a mobile communication device, an SMS, a news or journal article, or an e-book.

13. The method of claim 1, wherein the step of associating the semantic attribute with the word or phrase in the text content is implemented either before or after the user has selected the first name or description or the second name or description.

14. A system for discovering information in a text content and presenting the information, comprising:

a computer processor configured to
obtain a text content comprising one or more words or phrases;
display the name or description of a first semantic attribute and a second semantic attribute for users to select from in one or more selectable user interface objects, wherein the first semantic attribute or the second semantic attribute includes an attribute type or attribute value,
display an actionable user interface object, wherein the actionable user interface object is associated with a label representing the name or description of the first semantic attribute or the name or description of the second semantic attribute;
allow a user to select the name or description of the first semantic attribute or the name or description of the second semantic attribute as a user-specified or user-desired attribute,
identify, in the text content, a word or a phrase associated with the user-specified or user-desired attribute, and
perform an action on the word or phrase, wherein the action includes at least extracting, displaying, storing, showing or hiding, or highlighting or un-highlighting the word or phrase.

15. The system of claim 14, wherein the first semantic attribute and the second semantic attribute for user selection are associated with a shared semantic category or in the same semantic category.

16. The system of claim 15, wherein the first semantic attribute represents a meaning that is in contrast with the second semantic attribute in the shared semantic category, wherein the shared semantic category includes at least the semantic category of sentiment or opinion.

17. The method of claim 14, wherein the first semantic attribute or the second semantic attribute represents a threshold value of importance of the word or phrase in representing a topic or information focus in the text content.

18. A system for displaying terms extracted from a text content in a view format, comprising:

a computer processor configured to
obtain a data file containing words or phrases extracted from a text content;
display one or more selectable user interface objects configured to accept user selection for displaying the extracted words or phrases in one of a plurality of view formats; and
display the extracted words or phrases in the user-selected view format, wherein the text content comprises two or more words or phrases or sentences or paragraphs, wherein the method of extracting the words or phrases comprise the steps of:
(a) selecting a semantic attribute or a term importance threshold, wherein the semantic attribute includes an attribute type or value,
(b) identifying the words or phrases in the text content associated with the semantic attribute, or calculating a term importance measure for the words or phrases in representing information in the text content,
(c) extracting the words or phrases associated with the semantic attribute or with a term importance measure above the term importance threshold,
(d) organizing the extracted words or phrases into one or more view formats, wherein the view formats include at least a tree or hierarchical format, a list format with a list comprising the extracted words or phrases, or a cloud format with a multi-dimensional arrangement comprising the extracted words or phrases, and
(e) storing the extracted words or phrase in the data file.

19. The system of claim 18, when the view format is a tree or hierarchical format based on the grammatical or semantic relationships among the extracted words or phrases, the grammatical or semantic relationships among the extracted words or phrases in the tree or hierarchical format include a topic-subtopic relationship, or a topic-comment relationship, or a subject-predicate relationship, with the first-level node in the tree representing a topic and the second or lower-level node representing a sub-topic or a comment on the topic, or with the first-level node in the tree having the grammatical role of the subject of a sentence and the second or lower-level node having the grammatical role of at least part of a predicate of the corresponding sentence.

20. The system of claim 18, wherein the extracted words or phrases in the view format are displayed with or without the text content.

* * * * *